United States Patent Office 3,658,883
Patented Apr. 25, 1972

3,658,883
METHOD OF PREPARING LOWER-ALKYL MALONALDATES
Godefridus F. Steenbergen, Ter Apel, Netherlands, assignor to "Specta" Speciaal-Chemicalien Industrie Ter Apel N.V., Ter Apel, Netherlands
No Drawing. Filed Feb. 27, 1969, Ser. No. 803,051
Int. Cl. C07c 69/66
U.S. Cl. 260—484 R   7 Claims

ABSTRACT OF THE DISCLOSURE

Lower alkyl malonaldates (lower-alkyl esters of formylacetic acid) are obtained in the form of their alkali metal compounds in good yields at ambient temperature and pressure when lower-alkyl formate is added to a mixture of an excess of lower-alkyl acetate with an excess of an alkali metal lower-alkoxide.

This invention relates to the preparation of lower-alkyl malonaldates, and particularly to an improved method of preparing lower-alkyl malonaldates in the form of their alkali metal compounds from lower-alkyl formate, lower-alkyl acetate, and alkali metal lower-alkoxide.

When equimolecular amounts of formates and acetates of lower alkanols and alkali metal lower-alkoxides are reacted with each other, much carbon monoxide is formed, and the yield of the desired malonaldate is correspondingly reduced even when the reaction is performed with intensive cooling at temperatures of 5° C. or less. It has been proposed in U.S. Pats. Nos. 2,394,255 and 2,417,318 to improve the yield by performing the reaction under a blanket of carbon monoxide at elevated pressure. It is inconvenient and costly to operate in the necessary pressure vessel, and it is still necessary to provide intensive cooling in the initial stages of the reaction, although the reaction may not go to completion without later heating to 50° C.–60° C. The ultimately obtained reaction mixture is a dense slurry which can be handled only with difficulty.

It has now been found that the formation of carbon monoxide can be suppressed almost completely even when the reaction is carried out at ambient temperature over 15° C. and pressure if the lower-alkyl formate is added slowly to a mixture of respective excesses of the other two reactants. A lower-alkyl malonaldate can thus be prepared in a vessel open to the atmosphere and equipped with a stirrer and a cooling coil sufficient to maintain a temperature not substantially higher than 35° C.

For best results, the excess of lower-alkyl acetate over the lower-alkyl formate should not be substantially less than 50 mole percent, and the excess of the alkali metal lower-alkoxide over the formate should not be substantially less than 20 mole percent. The upper limits of these excess values are not critical, but no further advantages are achieved if the acetate excess is more than 170 mole percent, and the alkoxide excess is more than 75 mole percent.

When the preferred range of reactant ratios is used, most of the alkali metal compound of the malonaldate formed remains in solution in the reaction mixture, and the mixture is handled easily. The excess alkali or alkoxide present is generally beneficial for the alkaline condensation reactions for which the alkali metal malonaldates are useful intermediates.

The following examples are further illustrative of this invention, but it will be understood that the invention is not limited thereto.

EXAMPLE 1

A 500 liter reaction vessel of stainless steel was charged with 168 kg. ethyl acetate and 61.5 kg. sodium methylate. The reagents were stirred, and 45.8 kg. (46.6 liter) methyl formate were gradually added according to the following Table 1 which also lists the temperature readings obtained during the process.

TABLE 1

| Time, hours | Methyl formate total, liters | Temperature, ° C. |
|---|---|---|
| 0 | 0 | 12 |
| 0.17 | 5.6 | 15.5 |
| 0.39 | 10.6 | 24.5 |
| 1.00 | 14.8 | 25.5 |
| 2.30 | 29.3 | 25.5 |
| 2.52 | 33.0 | 29.5 |
| 3.10 | 35.9 | 31.0 |
| 4.30 | 41.0 | 32.5 |
| 7.30 | 46.6 | 31.0 |
| 21.00 | | 28.0 |

The lower-alkyl malonaldate was not recovered from the reaction mixture, but 66.7 kg. resorcinol were added thereto with cooling, and the resulting mixture was held at 60° to 70° C. for six hours.

67 kg. 7-hydroxycoumarin were recovered in a conventional manner, and had a melting point of 226°–229° C. The yield was 68.2%, based on the resorcinol used, and 54.2%, based on the methyl formate.

When the resorcinol was replaced by thiourea which was reacted with the sodium malonaldate suspension for one hour at 60° C., thiouracil was obtained with a yield of 73.3%, based on the thiourea, and about the same yield, based on the methyl formate.

The excess of the ethyl acetate over the methyl formate in this example was 150%, the excess of the sodium methylate 50%.

EXAMPLE 2

44 kg. (44.8 liter) methyl formate were added to a suspension of 70 kg. sodium methylate (74% excess) in 168 kg. ethyl acetate (156% excess) in the reaction vessel of Example 1. The reaction proceeded under the conditions listed in Table 2.

TABLE 2

| Time, hours | Methyl formate total, liters | Temperature, ° C. |
|---|---|---|
| 0 | 0 | 16.0 |
| 0.27 | 10.1 | 18.0 |
| 1.01 | 15.1 | 19.5 |
| 1.48 | 30.2 | 27.0 |
| 2.09 | 36.8 | 31.0 |
| 2.31 | 39.8 | 30.5 |
| 2.51 | 44.8 | 28.0 |
| 3.01 | | 25.0 |
| 5.24 | | 27.0 |

A very small amount of carbon monoxide formed during the first hour of the reaction. Water was run through the cooling coil for the first three hours, but was stopped after all the methyl formate had been added.

67.2 kg. resorcinol were added to the reaction mixture after cooling to 20° C., as in Example 1, and 73.1 kg. 7-hydroxycoumarin were recovered for a yield, based on the methyl formate, of 61.6%, and 73.2% based on the resorcinol.

Substantially the same yield of 7-hydroxycoumarin was obtained when the reaction mixture was diluted with two volumes of methanol, prior to the resorcinol addition, all other conditions being unchanged, and practically the same result was achieved when the malonaldate mixture was diluted with approximately 25%, volume, methanol prior to resorcinol addition, and the resulting mixture was kept at room temperature for 96 hours.

While the invention has been described with specific reference to lower-alkyl formates and acetates having one or two carbon atoms, the other lower-alkyl esters react in the same manner, but the resulting malonaldates are not economically attractive at this time. Similarly, sodium methylate may be replaced by other alkali metal lower-alkoxides, the potassium and lithium ethanolates and propanolates being obvious, but expensive substitutes for sodium methylate in the afore-described procedures.

The temperatures indicated in Tables 1 and 2 are merely typical of preferred practice with the equipment used, which provided very little cooling. Because of the limited cooling capacity available, it was preferred to reduce the temperature of the reactants prior to mixing to less than the approximate 15° to 32° C. range in which the reaction produces superior yields. If a maximum temperature of not substantially more than 32° C. can be maintained throughout the process, the starting temperature may be high as 24° C., without the loss of yield.

What is claimed is:

1. A method of producing an alkali metal lower-alkyl malonaldate which comprises:
   (a) adding lower-alkyl formate to a mixture of an excess of lower-alkyl acetate and an excess of alkali metal lower-alkoxide at a rate sufficiently slow to substantially prevent the formation of carbon monoxide, said rate of addition being such that the temperature of the reaction mixture does not vary by more than 20° C., and wherein said excess of said lower-alkyl acetate over said lower-alkyl formate is at least 50 mole percent, and the excess of said alkali metal lower-alkoxide over said lower-alkyl formate is at least 20 mole percent; and
   (b) holding said lower-alkyl formate in contact with said mixture until said alkali metal lower-alkyl malonaldate is formed.

2. The method of claim 1 wherein said lower-alkyl formate is held in contact with said mixture at a temperature of approximately 15° to 35° C.

3. The method of claim 2 wherein said alkali metal is sodium, and said lower alkyl and said lower alkoxide have no more than two carbon atoms each.

4. The method of claim 3 wherein said excess of said lower-alkyl acetate is not more than 170 mole percent, and said excess of said alkali metal lower-alkoxide is not more than 75 mole percent.

5. The method of claim 3 wherein said lower-alkyl acetate is ethyl acetate, said alkali metal lower-alkoxide is sodium methylate, and said lower-alkyl formate is methyl formate.

6. The method of claim 2 wherein said lower-alkyl formate is added to said mixture and held in contact with said mixture until said malonaldate is formed while said mixture is under substantially atmospheric pressure.

7. The method of claim 2 wherein said lower-alkyl formate is held in contact with said mixture until said malonaldate is formed while said mixture is contained in a vessel open to the atmosphere.

References Cited
UNITED STATES PATENTS

| | | | |
|---|---|---|---|
| 2,394,255 | 2/1946 | Northey | 260—483 |
| 2,417,318 | 3/1947 | Northey | 260—483 X |

LORRAINE A. WEINBERGER, Primary Examiner

P. J. KILLOS, Assistant Examiner

U.S. Cl. X.R.

260—250 A, 343.5